United States Patent [19]
Tada

[11] Patent Number: 4,891,988
[45] Date of Patent: Jan. 9, 1990

[54] VORTEX FLOWMETER
[75] Inventor: Yasuo Tada, Hyogo, Japan
[73] Assignee: Mitsubishi Denki Kabushiki Kaisha, Tokyo, Japan
[21] Appl. No.: 317,488
[22] Filed: Mar. 1, 1989
[30] Foreign Application Priority Data Mar. 1, 1988 [JP] Japan .............................. 63-27667[U]

[51] Int. Cl.$^4$ ............................................. G01F 1/32
[52] U.S. Cl. ................................ 73/861.22; 73/861.24
[58] Field of Search ......................... 73/861.24, 861.22

[56] References Cited
U.S. PATENT DOCUMENTS 4,161,878  7/1979  Fussell, Jr. ...................... 73/861.24
4,520,678  6/1985  Kozrol et al. .................... 73/861.24

Primary Examiner—Joseph A. Orsino
Assistant Examiner—Hollis T. Chen
Attorney, Agent, or Firm—Sughrue, Mion, Zinn, Macpeak and Seas

[57] ABSTRACT

Pressure variation produced in a conduit is transmitted through two pressure conduits to two pairs of pressure chambers, the pressure chambers in each pair being partitioned by a diaphragm having a bridge circuit which provides an output related to a deformation of the diaphragm, so that deformations of the diaphragms produce outputs which are opposite in phase and have magnitudes of the same absolute value and which are summed for vortex pressure detection and subtracted for other pressure.

2 Claims, 2 Drawing Sheets

VORTEX FLOWMETER

BACKGROUND OF THE INVENTION

The present invention relates to a vortex flowmeter capable of measuring very small flow and having an improved anti-vibration characteristics.

There have been various vortex flowmeters for detection of fluid pressure and, among others, a flowmeter in which vortex pressure is transmitted to a pair of chambers partitioned by a diaphragm and vortex pressure is detected as a difference in pressure between the chambers is disclosed in, for example, Japanese Patent Publication No. 3725/1979.

In such conventional flowmeter, in order to detect vortex pressure in a very small flow rate range, the diaphragm partitioning the chambers must be very sensitive. When such highly sensitive diaphragm is used, it may also respond to other forces, such as vibration, than vortex pressure, leading an erroneous detection.

SUMMARY OF THE INVENTION

An object of the present invention is to solve the problem mentioned above and to provide a vortex flowmeter capable of measuring even minute vortex pressure and having high anti-vibration characteristics.

A vortex flowmeter according to the present invention comprises a first pressure conduit for transmitting a variation of pressure of Karman vortex produced in fluid flow along a conduit, to be detected flows, to a first and a fourth pressure chambers, a second pressure conduit for transmitting the variation of vortex pressure to a second and a third pressure chambers, a first and a second diaphragms provided in a partition wall portion between the first and the second pressure chambers and a partition wall portion between the third and the fourth pressure chambers, respectively, a first and a second bridge circuits formed on the first and the second diaphragms, respectively, and a differential amplifier circuit for amplifying a difference of output between the first and the second bridge circuits.

A variation of pressure of Karman vortex produced in a downstream of a vortex generator arranged in the conduit is transmitted through the first and the second pressure conduits to the first and the fourth pressure chambers and to the second and the third pressure chambers, respectively, to allow the first and the second diaphragms to respond to differences of vortex pressure so that a sum of outputs of the bridge circuits is obtained from the differential amplifier circuit as vortex pressure and a difference between the outputs of the bridge circuits is obtained from the differential amplifier circuit for other external force applied thereto.

DETAILED DESCRIPTION OF THE PREFERRED EMBODIMENT

Figure 1:
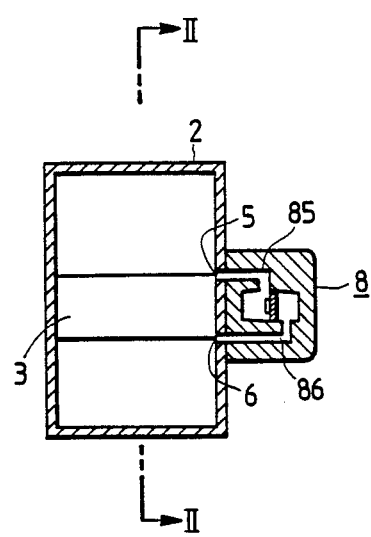
FIG. 1 shows a cross section of an embodiment of a vortex flowmeter according to the present invention.
Figure 2:
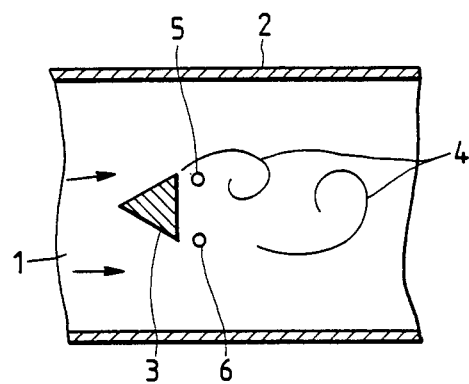
FIG. 2 is a cross section taken along a line II—II in FIG. 1.

In the vortex generating portion shown in FIG. 2 which is a cross section taken along a line II—II in FIG. 1, a vortex generator 3 is disposed orthogonally to fluid flow 1 to be measured in a conduit 2 such that Karman vortex 4 is generated downstream of the vortex generator 3. Pressure of Karman vortex 4 is detected through pressure deriving ports 5 and 6 formed in a side wall of the conduit 2 at both sides of the vortex generator 3 downstream thereof.

The conduit 2 shown in FIG. 1 is associated with a vortex pressure detector 8 coupled to the conduit through the pressure deriving ports 5 and 6.

Figure 3:
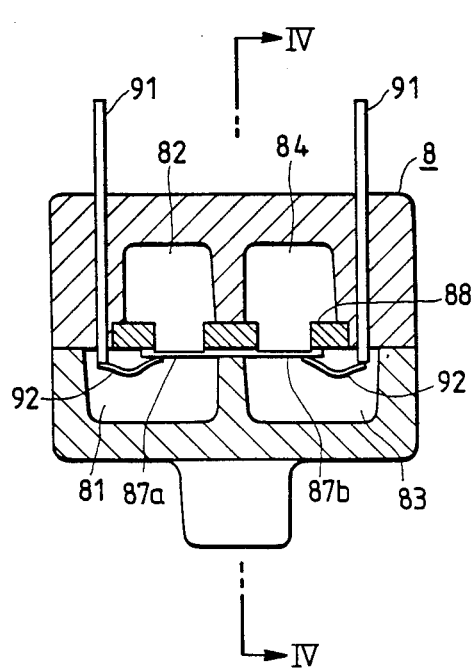
FIG. 3 is a cross section of a vortex pressure detecter of the vortex flowmeter.
Figure 4:
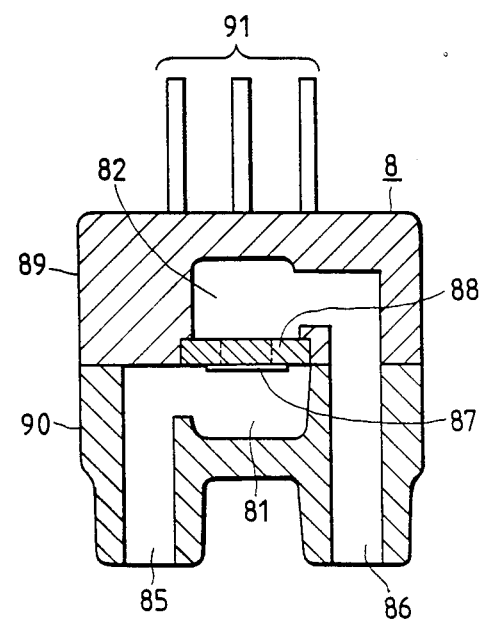
FIG. 4 is a cross section taken along a line IV—IV in FIG. 3.

As shown in FIGS. 3 and 4, the pressure detector 8 is composed of package members 89 and 90 which are firmly connected to each other to form a package. Pressure conduit portions 85 and 86 are formed therein and adapted to be connected, on one hand, to the pressure deriving ports 5 and 6, respectively, and, on the other hand, to pressure chambers 81 to 84 also formed in the package.

The pressure chambers 81 and 84 are connected to the pressure conduits 85 and the pressure chambers 82 and 83 are connected to the pressure conduit 86. Diaphragms 89a and 87b are provided between the pressure chambers 81 and 82 and between the pressure chambers 83 and 84 as partition walls, respectively. The diaphragms 87a and 87b are supported by a semiconductor chip 87 provided on a rigid plate 88 supported in the package.

A reference numeral 91 depicts lead terminals to which four terminals of two semiconductor bridge circuits (not shown in FIGS. 1 to 4) provided on the diaphragms 87a and 87b are to be connected through wires 92.

Figure 5:
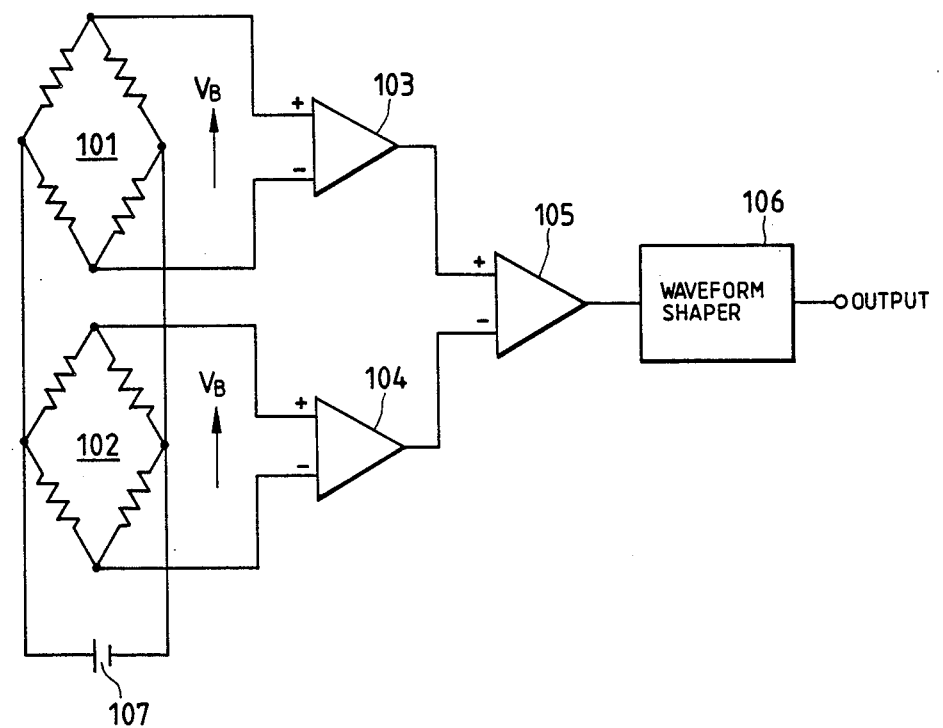
FIG. 5 is a block circuit diagram of a control portion of the present vortex flowmeter.

FIG. 5 is a block circuit diaphragm of a control portion of the present vortex flowmeter. In FIG. 5, each of a first bridge circuit 101 and a second bridge circuit 102 is composed of four piezo resistance elements provided on each of the diaphragm 87a and 87b shown in FIG. 3.

Outputs of the first and the second bridge circuits 101 and 102 are supplied to a first and a second differential amplifiers 103 and 104, respectively. Outputs of the differential amplifiers 103 and 104 are supplied to a third differential amplifier 105.

An output of the third differential amplifer 105 is supplied to a waveform shaper 106 an output of which is an output of the vortex flowmeter. The bridge circuits 101 and 102 are powered by a power source 107.

In operation, when fluid 1 to be measured flows through the conduit 2, there are opposite vortexes produced alternatively downstream of the vortex generator 3 as shown in FIG. 2. The vortexes are generately called as Karman vortex series. The generation of Karman vortex 4 depends upon a variation of fluid pressure.

Therefore, due to the fact that a corresponding variation of pressure is produced on a wall surface of the conduit 2 along Karman vortexes 4, alternative pressure variations are produced in the pressure deriving ports 5 and 6 oppositely provided in the wall surface of the conduit 2 behind the vortex generator 3. It should be noted, at this time, that vortex pressure is generally negative.

Assuming clockwise vortex, negative pressure is produced in the pressure deriving port 5. This negative pressure is transmitted through the pressure conduit 85 to the pressure chambers 81 and 84. Therefore, the diaphragms 87a and 87b will be deformed toward the side of the pressure chambers 81 and 84, respectively.

Then, when counterclockwise vortex is generated, the pressure deriving port 6 becomes negative pressure which is transmitted through the pressure conduit 86 to the pressure chambers 82 and 83, resulting in the diaphragms 87a and 87b deformed toward the side of the pressure chambers 82 and 83, respectivley.

It is assumed at this time that, when the diaphragms 87a and 87b are deformed toward the side of the pressure chambers 81 and 83, the outputs of the first and the second bridge circuits 101 and 102 are in a direction $V_B$ as shown in FIG. 5. Therefore, for clockwise vortex, the output of the first bridge circuit 101 is $-v_B$ and that of the second bridge circuit 102 is $+v_B$.

The output $+V_B$ and $-V_B$ of the first and the second bridge circuits 101 and 102 are amplified by the first and the second differential amplifiers 103 and 104 with predetermined amplification factors to $+V_B$ and $-V_B$, respectively, which are supplied to a (+) input and a (−) input of the third differential amplified 105, resulting in $2V_B$ at an output thereof. Of course, this output $2V_B$ of the differential amplifier 105 is unchanged with reversing of connection of the outputs of the amplifiers 103 and 104 to the input terminals of the amplifier 105.

That is, the outputs of the diaphragms 87a and 87b are summed and, thus, it becomes possible to detect very small vortex pressure.

As other external pressure than vortex pressure possibly exerted on the diaphragms 87a and 87b, a pulsation of fluid, i.e., pressure variation in the conduit 2 due to flow change of fluid 1 to be measured may be considered. Since such pulsation propagates for a relatively long distance from an upstream to the downstream of the vortex generator 3, it takes in the form of complete plane traveling wave in the conduit 2. It means that pressure variations in the pressure deriving ports 5 and 6 are the same, in time and magnitude, which are transmitted through the pressure conduits 85 and 86 to the pressure chambers 81 and 84 and the pressure chambers 82 and 83, respectively.

Considering one of the diaphragms, say, diaphragm 87a, it is not deformed when pressures and pressure variations in the pressure chambers 81 and 82 are the same. Therefore, the first bridge circuit 101 and, hence, the control circuit of the flowmeter does not provide an output.

As another external force, a vibration of the vortex pressure detector 8 may be considered. When a direction of such vibration is orthogonal to the diaphragms 87a and 87b, the latters are not effected thereby and, thus, there is no output of the control circuit of the flowmeter.

In a case where vibration applied includes component or components by which the diaphragms 87a and 87b can be subjected to deformation, such components may affect the diaphragms at the same time, with the same magnitude and in the same direction.

Therefore, the first and the second bridge circuits 101 and 102 provide the same output, $v_B$, which are amplified by the first and the second differential amplifiers 103 and 104 to $V_B$ which is supplied to the third differential amplifier 105.

Since $V_B$ outputs of the amplifiers 103 and 104 are supplied to the (+) and the (−) input terminals of the differential amplifier 105, the latter does not provide an output. Therefore, no output is obtained from the control circuit of the flowmeter.

It should be noted that, although the diaphragms 87a and 87b are provided on the single semiconductor chip 87 in the embodiment shown in FIG. 4 to make them identical in both configuration and electric characteristics, it is possible to from the diaphragms 87a and 87b separately as long as they have identical mechanical and electrical characteristics.

As mentioned hereinbefore, according to the present invention, in order to detect pressure variation produced in the pressure deriving ports, a diaphragm is provided in each of partition walls between the first and the second pressure chambers and between the third and the fourth pressure chambers, the first and the second bridge circuits are actuated by deformations of the diaphragms to produce outputs which are opposite in phase and have magnitudes of the same absolute value, the first and the second differential amplifiers amplify them and the amplified outputs are summed for detector of Karman vortex pressure or subtracted from each other for external vibration, etc. Therefore, it becomes possible to detect even minute vortex pressure while excluding effect of external force.

What is claimed is:

1. A vortex flowmeter, comprising: a first pressure conduit for transmitting the variation of pressure due to a Karman vortex in a conduit, through which fluid to be detected flows, to a first and a fourth pressure chambers, a second pressure conduit for transmitting a variation of vortex pressure to a second and a third pressure chambers, a first and a second diaphragms provided in a partition wall portion between said first and said second pressure chambers and a partition wall portion between said third and said fourth pressure chambers, respectively, a first and a second bridge circuits formed on said first and said second diaphragms, respectively, and a differential amplifier circuit for amplifying a difference of output between said first and said second bridge circuits.

2. The vortex flowmeter as claimed in claim 1, wherein said differential amplifier circuit comprises a first differential amplifier having inputs connected to said first bridge circuit, a second differential amplifier having inputs connected to said second bridge circuit and a third differential amplifier having inputs connected to outputs of said first and said second differential amplifiers.

* * * * *